United States Patent
Smith

(10) Patent No.: US 6,525,652 B2
(45) Date of Patent: Feb. 25, 2003

(54) DOWNSHIFTING WARNING SYSTEM

(76) Inventor: Clayton S. Smith, 2246 E. Northside Dr., Jackson, MS (US) 39211

( * ) Notice: Subject to any disclaimer, the term of this patent is extended or adjusted under 35 U.S.C. 154(b) by 0 days.

(21) Appl. No.: 09/798,157

(22) Filed: Mar. 2, 2001

(65) Prior Publication Data

US 2002/0121968 A1 Sep. 5, 2002

(51) Int. Cl.[7] .................................................. B60Q 1/00
(52) U.S. Cl. .................... 340/425.5; 340/463; 340/464; 340/467; 340/468; 340/479
(58) Field of Search ............... 340/425.5, 463, 340/464, 466, 467, 468, 479, 456, 441; 307/9.1, 10.1, 10.8

(56) References Cited

U.S. PATENT DOCUMENTS

| | | | | |
|---|---|---|---|---|
| 4,105,994 A | * | 8/1978 | Chicoine | 340/468 |
| 4,107,647 A | * | 8/1978 | Yoshino | 340/467 |
| 4,162,384 A | * | 7/1979 | Chicoine | 340/468 |
| 4,807,101 A | * | 2/1989 | Milde, Jr. | 362/276 |
| 5,381,135 A | * | 1/1995 | Blount | 340/487 |
| 5,838,259 A | * | 11/1998 | Tonkin | 340/903 |
| 5,852,399 A | * | 12/1998 | Pettijohn | 340/467 |
| 6,020,814 A | * | 2/2000 | Robert | 340/467 |
| 6,133,852 A | * | 10/2000 | Tonkin | 340/903 |
| 6,278,364 B1 | * | 8/2001 | Robert | 340/467 |

* cited by examiner

Primary Examiner—Toan Pham
(74) Attorney, Agent, or Firm—The Matthews Firm

(57) ABSTRACT

The present invention relates to a vehicle warning lighting system having a novel automatic warning light activation system utilized with a conventional vehicle brake lighting system. The downshifting deceleration safety system, including and accelerometer and an optional tachometer, will automatically activate the conventional vehicle brake lighting system under conditions of downshifting causing deceleration. The conventional vehicle brake lighting system includes a battery member being a power source connected through a brake pedal switch to brake light members. Depression of a brake pedal closes the brake pedal switch to energize the brake light members in a conventional manner.

11 Claims, 5 Drawing Sheets

DOWNSHIFTING WARNING SYSTEM

FIELD OF THE INVENTION

This invention relates to a warning system that will automatically activate a vehicle's warning lights for alerting a driver of a following vehicle when a leading vehicle is decelerating by way of solely downshifting. This system is adapted to be utilized with conventional vehicle warning lighting systems.

BACKGROUND OF THE INVENTION

Vehicles are normally equipped with conventional brake lights that are turned on upon activation of the brake pedal when slowing down or stopping the vehicle. A driver in a following vehicle will be alerted accordingly. However, the driver of a following vehicle will generally receive no such warning if the leading vehicle is decelerating by way of solely downshifting.

The present invention contemplates the automatic activation of the vehicle's warning lights upon deceleration by downshifting. Thus the following vehicle will see the warning lights when the leading vehicle decelerates by downshifting and be able to react more quickly thereby avoiding a collision which might otherwise occur.

Each year, in the United States alone, there are approximately twelve million auto accidents resulting in more than forty thousand deaths and two million injuries. It is estimated that approximately half are rear-end type collisions. If the invention disclosed herein could reduce these figures by only five percent, the human and financial benefits would be enormous.

Modern highway systems in or near metropolitan areas are designated to accommodate large volumes of high speed vehicular traffic. It appears, however, that many commuters who use these highways on a regular basis are so familiar with the layout of the roadway that they become complacent and follow too closely or fail to use proper caution under circumstances of reduced visibility. This has resulted in an alarming increase in the frequency and severity of chain reaction collisions both in this country and abroad.

The Downshifting Warning System according to the present invention, by providing the earliest possible indication of deceleration, would greatly diminish the frequency and severity of such events.

DESCRIPTION OF THE PRIOR ART

The use of brake lights is known in the prior art. More specifically, brake lights heretofore devised and utilized are known to consist basically of familiar, expected and obvious structural configurations, notwithstanding the myriad of designs encompassed by the crowded prior art which have been developed for the fulfillment of countless objectives and requirements. Known prior art brake lights include U.S. Pat. No. 4,922,225; U.S. Pat. No. 4,107,647; U.S. Pat. No. 4,575,782; U.S. Pat. No. 4,806,782; U.S. Pat. No. 4,034,338; and U.S. Pat. No. Des. 332,234.

Various systems exist for controlling vehicle brake lights to indicate braking situations to following vehicles. The conventional system is a mechanical switch that closes on brake activation to energize the brake lights. Then, upon release of the brake switch, the switch opens and the lights extinguish.

U.S. Pat. No. 4,990,887 discloses a brake light arrangement that provides a time delay in the extinguishing of lighted brake lights. Thus, when the lights are energized they will continue to be illuminated for a predetermined period of time.

U.S. Pat. No. 5,139,115 discloses a system in which the brake lights are lighted in the usual manner under normal braking conditions but flash when the anti-lock braking system of the vehicle is activated.

U.S. Pat. No. 6,023,221 discloses a system in which the hazard lights are lighted during emergency situations involving hard braking and rapid deceleration of the vehicle.

U.S. Pat. Nos. 4,105,994; 4,158,833; and 5,852,399 each disclose a system comprising an open switch located on a standard transmissions gear shift module which activates the vehicle's brake lights when the transmission's gear shift lever engages the receiving gear module, thus closing the circuit.

In these respects, the Downshifting Warning System according to the present invention substantially departs from the conventional concepts and designs of the prior art, and in so doing provides an apparatus for alerting a driver of a following vehicle when a leading vehicle is decelerating by way of solely downshifting.

DETAILED DESCRIPTION OF THE PREFERRED EMBODIMENT

Figure 1:
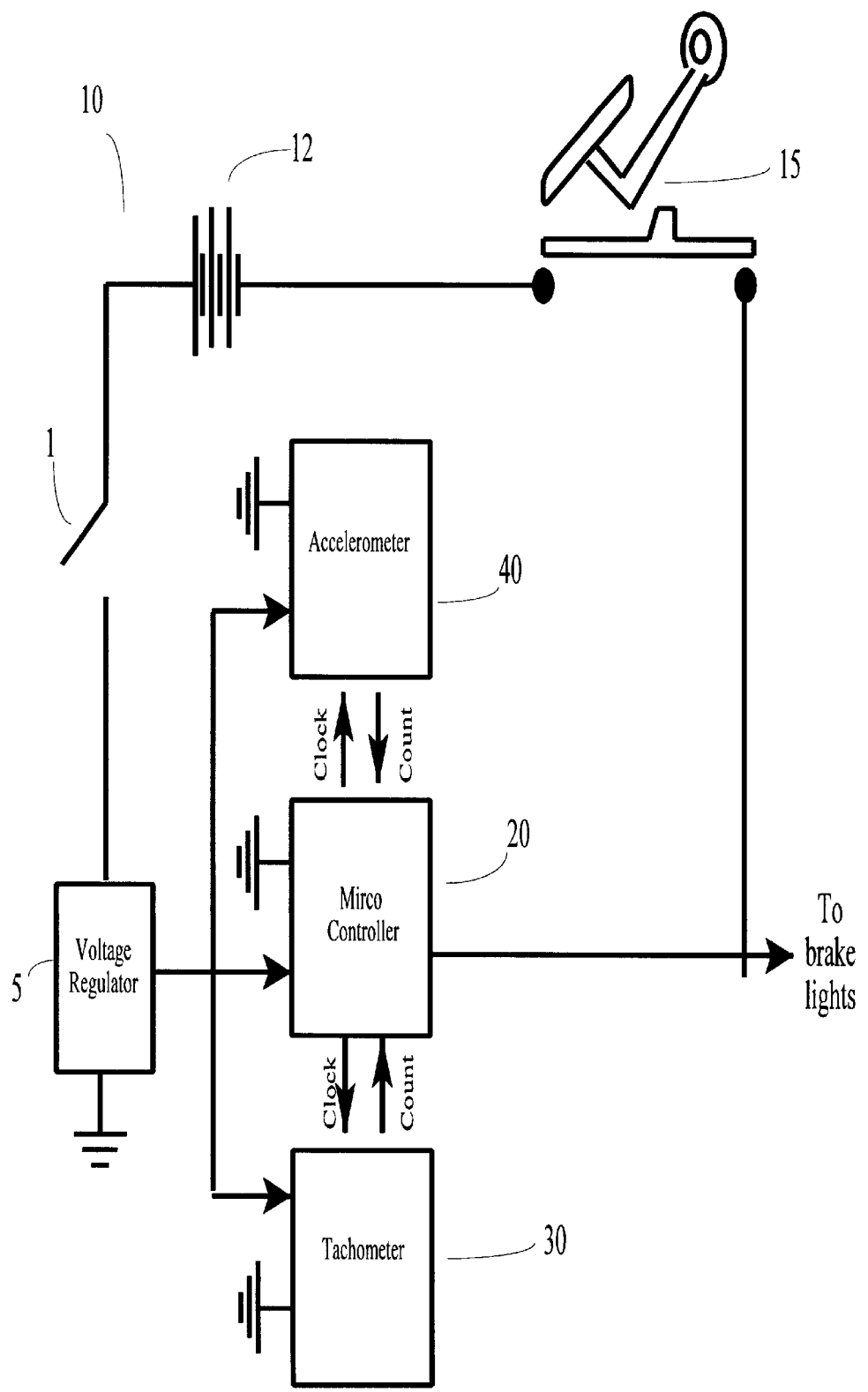
FIG. 1 is a schematic diagram of the downshifting warning system according to the present invention.

Referring now to FIG. 1, the electrical components of the invention are indicated at 10. The vehicle power source 12 that is available only when the ignition key 1 is on supplies current to a voltage regulator 5. The power source also continuously supplies voltage to the manual brake pedal switch 15 which is activated when the vehicle's brake pedal is engaged.

The voltage regulator reduces vehicle electrical system voltage to the required input level for the digital circuitry which is normally +5 volts for commercially available components. In the event that application specific integrated circuitry to operate on the vehicle electrical system voltage is used, the voltage regulator would not be required.

The digital accelerometer's 40 integrated electronics chip measures changes in capacitance caused by acceleration and converts those changes into a digital pulse output. The digital accelerometer 40 usually consists of a sensing element and an electronic chip assembled in an integrated unit. The sensing element consists of machined microstructures that respond to acceleration by changing their capacitances. In common and conventional accelerometer designs, the vehicle's acceleration produces a moment about an axis which allows a suspended plate to rotate, constrained only by the spring constant of the suspended plate's connection to an axis. The suspended plate and a corresponding fixed plate are positioned to form air-gap variable capacitors with a common connection thus creating a fully active capacitance bridge. The average distance between the suspended plate and the fixed plate decreases due to the moment caused by a change in vehicular acceleration, thus increasing its capacitance. Conversely, the average distance between the suspended plate and the fixed plate increases due to the moment caused by an opposite change in vehicular acceleration, thus decreasing its capacitance. The integrated chip converts the small capacitance changes between the sensing elements into a useful electrical signal. These electronics must be closely coupled to the sensing elements to accurately measure the minuscule acceleration-caused changes in capacitance that occur in the presence of much larger stray capacitances. The digital accelerometer 40 generates a pulse stream whose frequency (or, more precisely, pulse density) is proportional to acceleration. Such digital acceleration units are commercially available devices and may be of the type sold by Silicon Designs, Inc. as Model 1010, AnalogDevices ADXL250, Quatech's QTC-350, or Analog Devices ADXL 105. The digital accelerometer's 40 input signal may be derived in any known way providing it has a frequency proportional to the vehicle's acceleration. In the event that the vehicle utilizes an existing digital accelerometer as set out above, the digital accelerometer 40 of the present invention would not be required. The output signal from the existing accelerometer could be coupled with the present invention, thus eliminating the requirement for an additional duplicative unit. Additionally, an analog accelerometer can be utilized with the addition of a digitizer to convert the analog output signal to a digital one. Such analog accelerometer generates a differential voltage output proportional to acceleration whose output could easily be converted with the addition of an in series digitizer.

A digital tachometer 30 includes a circuit for receiving a pick-up pulse having a frequency related to the rotation speed of the engine and outputting a wave shaped pick-up pulse. The tachometer comprises a circuit means for receiving a pick-up pulse, the frequency of which is related to the rotational speed of the engine and for outputting a wave shaped pick-up value. A multiplier/divider is often an integral component of a tachometer, utilized for receiving the pick-up pulses and divides them by the number of pulses per revolution to provide pulses indicative of engine rotational speed. The multiplier/divider circuit provides a d.c. output reference voltage indicative of speed in addition to the speed pulses which are each of equal duration and voltage but have varying intervals depending upon the speed of the engine. The digital tachometer 30 generates pulses resulting from rotation of the vehicle's shaft, counted over a predetermined time interval established by the microcontroller's clock generator. The larger the number of pulses counted within a time interval, the higher the speed of the shaft. Thus, the count of pulses within the time interval is proportional to the shaft speed.

The digital tachometer 30 utilized in this invention functions to accurately measure the speed of rotation of the vehicle's crankshaft, providing it is possible to derive a synchronous electrical signal representing a fraction of a revolution, a whole revolution, or a predetermined number of revolutions. Thus the purpose of the digital tachometer 30 of the present invention is for measuring the speed of rotation of a rotating device, which can provide an output signal which has great accuracy due to rapid updating as the speed of rotation of the rotating device changes.

The speed of rotation of a rotating device may be determined by various means including counting pulses derived from an electrical signal produced by means sensitive to the speed of rotation of the engine's crankshaft the frequency of which sensor signal is a function of the speed of rotation of the engine's crankshaft, characterized by the fact that it comprises means for deriving from the said sensor signal, a first electrical signal, comprising a train of pulses the pulse repetition frequency of which is variable and directly related to the instantaneous frequency of the said sensor signal by a predetermined scale factor, counting means fed with the said first signal, processing means fed with the said first signal and operable to produce a second signal in the form of a train of pulses the frequency of which a predetermined given number of pulses would occur in the immediately preceding interval between two successive pulses of the first signal, interpolation means fed with the said second signal and operative to count the pulses thereof, a time base circuit which generates a signal controlling the operation of the said counting means such that these count the pulses of the said first signal only during successive counting intervals each of predetermined duration, memory means which are fed with a signal representing the content of the counting means accumulated during the last complete counting interval together with the content of the interpolation means accumulated between the last pulse of the said first signal and the end of the counting interval, and output means for generating a signal corresponding to changes in the vehicle's crankshaft change in rate of rotation.

The digital tachometer's 30 input signal may be derived in any known way providing it has a frequency proportional to the speed of rotation it is required to measure. It is understood that the digital tachometer according to the present invention may operate from a capacitor discharge ignition or other suitable signal source, such as a magnetic pick-up. An electrical signal representing the speed of rotation of an internal combustion engine can be derived simply and directly, by connecting the lead to the contact breaker of the coil ignition: alternatively the signal can be obtained from a detector such as a coil wire wound around a sparkplug lead. Other known means, such as electric, magnetic, or electromagnet detectors may be used, to obtain a periodic input signal on the input lead, with a frequency proportional to the speed of rotation it is desired to measure. Where the speed of rotation of an internal combustion engine is detected by sensing the electrical surge voltages at the contact breaker or in a spark plug high tension lead, due allowance must be made for the relationship between the frequency of the signal and the speed of rotation of the engine.

Such digital tachometer units are commercially available devices. In the event that the vehicle utilizes an existing digital tachometer as set out above, the digital accelerometer of the present invention would not be required.

A microcontroller 20 includes a clock generator which is activated upon closure of the ignition key switch 1. The clock generator comprises a highly stable oscillator, suitably of the quartz type, and a plurality of counting decades which, by means of known output circuits, provides various output signals of different frequencies. The clock signal can also operate to synchronize the tachometer and accelerometer's input signals. The clock generator's signal is fed to the digital tachometer 30 unit which compensates for the relation between the frequency of the signal and the actual number of revolutions per unit time of the rotating device being measured. The clock signal is transmitted to the digital accelerometer 40 and the number of generated per clock cycle represents both the amount and direction of acceleration of the vehicle. That is, based on rated measuring capacity of a single output accelerometer 40, a zero pulse rate would indicate full scale negative acceleration, and a maximum pulse rate would indicate full scale positive acceleration. A mid-range value would reflect zero acceleration. If utilizing a multiple output accelerometer, a zero pulse rate would reflect zero acceleration and changes in pulse rates would be indicative of changes in acceleration.

A clock signal is also transmitted to the digital tachometer 30 and the number of pulses generated per clock cycle represents the amount rotation of the vehicle engine crankshaft. The rate of change in the speed of rotation of the vehicle's engine crankshaft per predetermined unit of time is utilized to determine the rate of change or rotations of the crankshaft.

Figure 2:
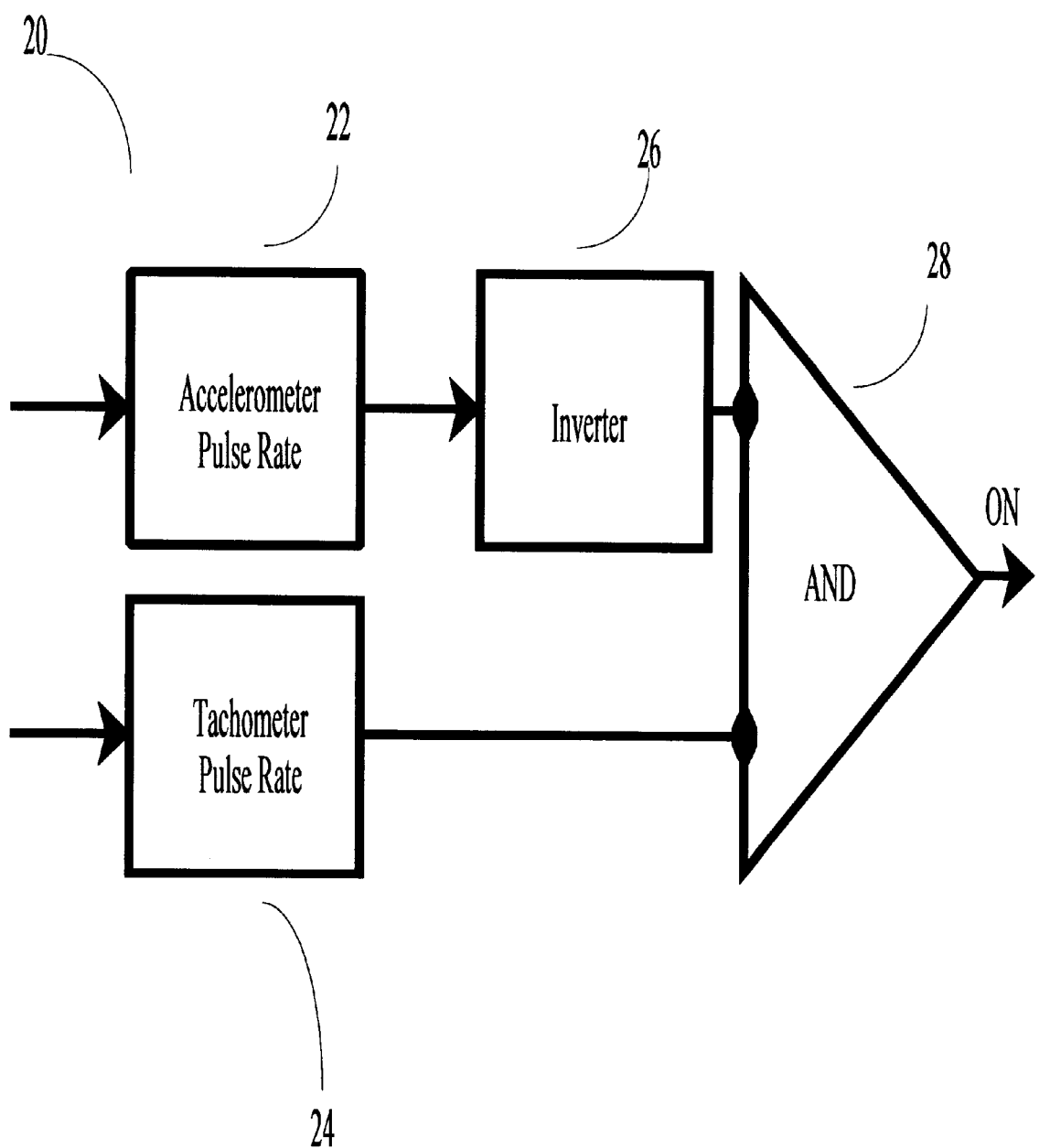
FIG. 2 is a schematic diagram of the microcontroller "AND" switch of FIG. 1.

As shown in FIG. 2, the microcontroller 20 is programmed to transmit an "on" signal when both an accumulated pulse count indicative of a predetermined threshold rate of deceleration is recognized at the same time as an accumulated pulse count exceeding a predetermined threshold rate of change in speed of rotation of the vehicle engine crankshaft is recognized. The microcontroller 20 comprises an "AND" switch 28 requiring both predetermined threshold signals from the tachometer 30 and the accelerometer 40. Assuming that the tachometer indicated change in pulse rate (+) 24 exceeds a predetermined threshold rate of crankshaft rotations and the accelerometer indicates a pulse rate (−) 22 indicative of deceleration exceeding a predetermined threshold rate of deceleration, then both signals would activate and complete the "AND" switch, thus activating the vehicle's warning lights. It is understood that if a negative analog signal or negative digital signal is generated as an output signal from the accelerometer 22, a signal inverter 26 positioned in series to reverse the negative signal, thus making it a positive one, to activate the "AND" switch 28, thus sending a signal to illuminate the vehicle's warning lights. The use of the inverter circuit 26 assumes the accelerometer used has a negative signal for deceleration and a positive signal output for acceleration. If the accelerometer has two positive outputs, one for deceleration and one for acceleration, the inverter can be eliminated.

Figure 3:
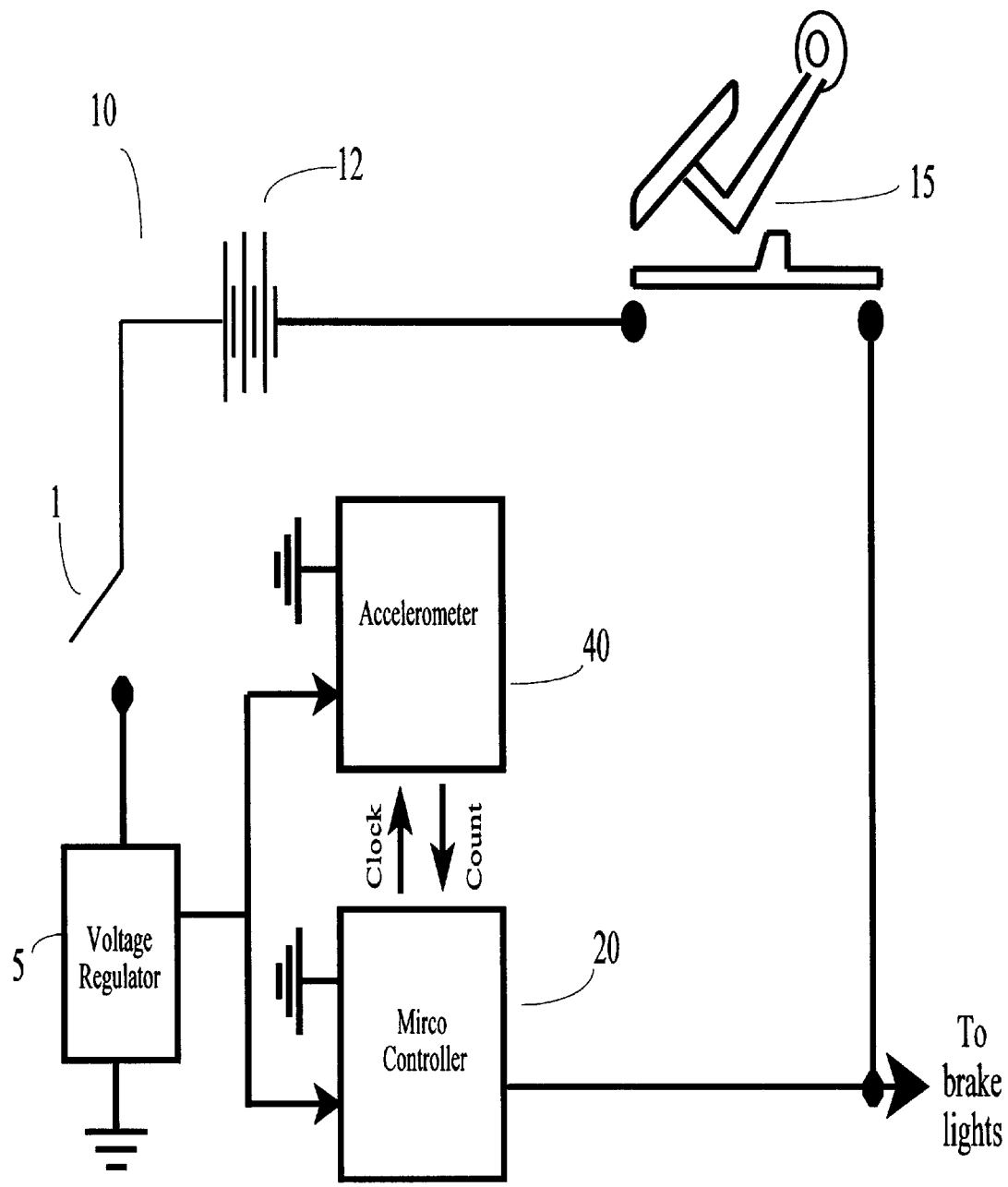
FIG. 3 is a schematic diagram of an alternative embodiment of the downshifting warning system according to the present invention.

As seen in FIG. 3, an alternative embodiment of the present invention eliminates the additional input of a tachometer 30. Therefore, the microcontroller's 20 clock generator would only generate a clock signal for transmittal to the digital accelerometer 40 and the number of pulses generated per clock cycle represents both the amount and direction of acceleration of the vehicle. That is, based on rated measuring capacity of the accelerometer 40, a zero pulse rate would indicate full scale negative acceleration, and a maximum pulse rate would indicate full scale positive acceleration. A mid-range value would reflect zero acceleration. The digital accelerometer 40 generates a pulse stream whose frequency (or, more precisely, pulse density) is proportional to acceleration.

Figure 4:
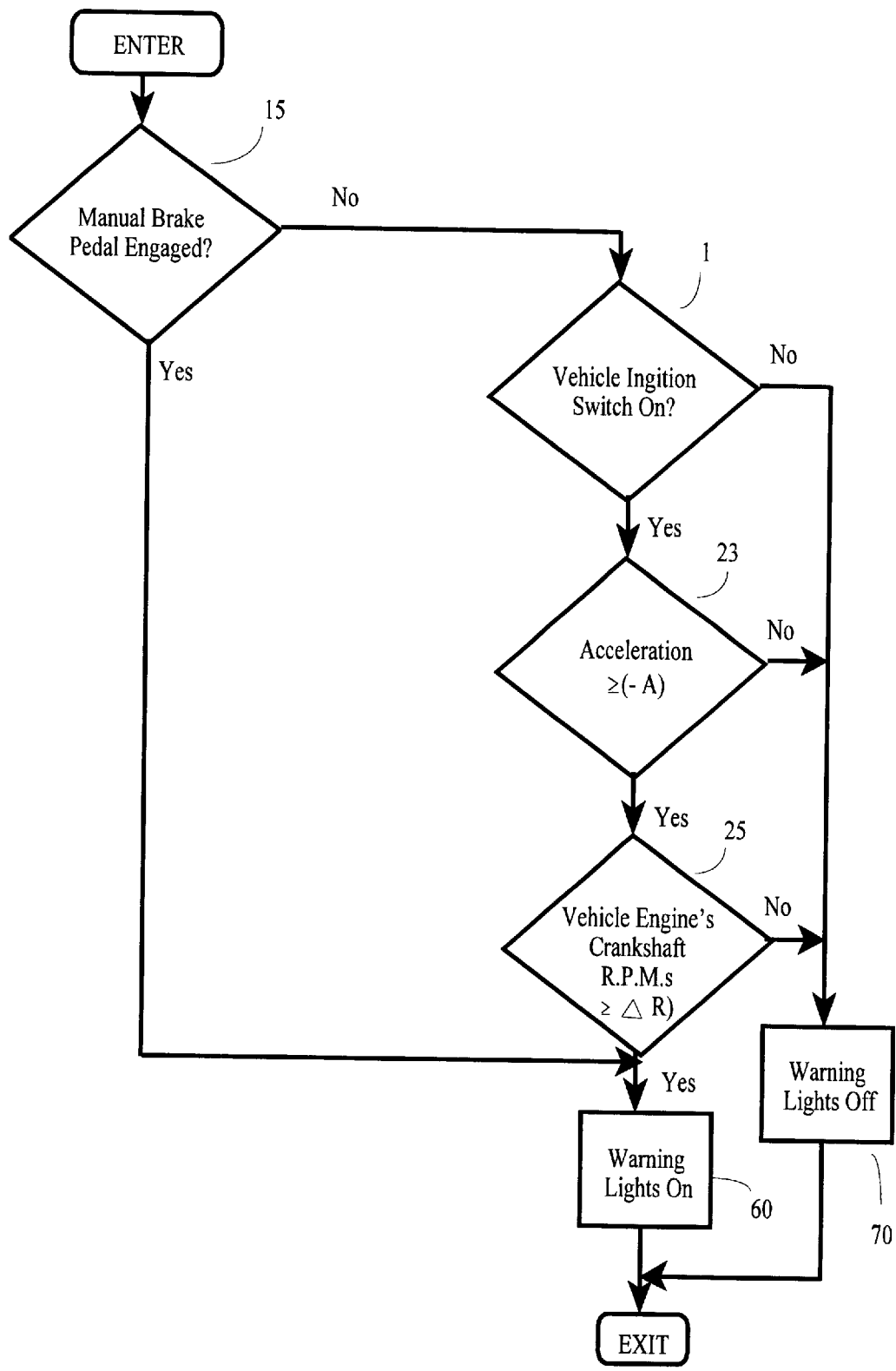
FIG. 4 is a flow diagram illustrating the operation of the electronic unit in accordance with the principles of this invention.

FIG. 4 depicts a flow diagram illustrating the operation of the present invention in accordance with the principles of this invention. As seen in this diagram, the manual brake pedal switch 15 acts independent of the present invention, thus preventing the downshifting warning system from interfering with the driver's manual activation of the brake lights. In this embodiment, the vehicle's acceleration is compared to a predetermined threshold rate of acceleration "A." If the vehicle's acceleration equals or exceeds this predetermined rate of acceleration, then the vehicle engine's crankshaft rate of rotation will be compared to a predetermined threshold of rate of rotation "R." If the vehicle's acceleration exceeds the predetermined threshold rate of acceleration "A" and vehicle engine's crankshaft rate of rotation exceeds a predetermined threshold rate of rotation "R" then a signal will be transmitted to activate the vehicle's warning lights. Although the measure of acceleration and crankshaft rotations are in series and the measure of acceleration occurs first, it is understood that the measure of crankshaft rotations per minute can be measured first. Additionally, this circuit or flow diagram can be designed as a parallel circuit without the tachometer and accelerometer in a series configuration.

Figure 5:
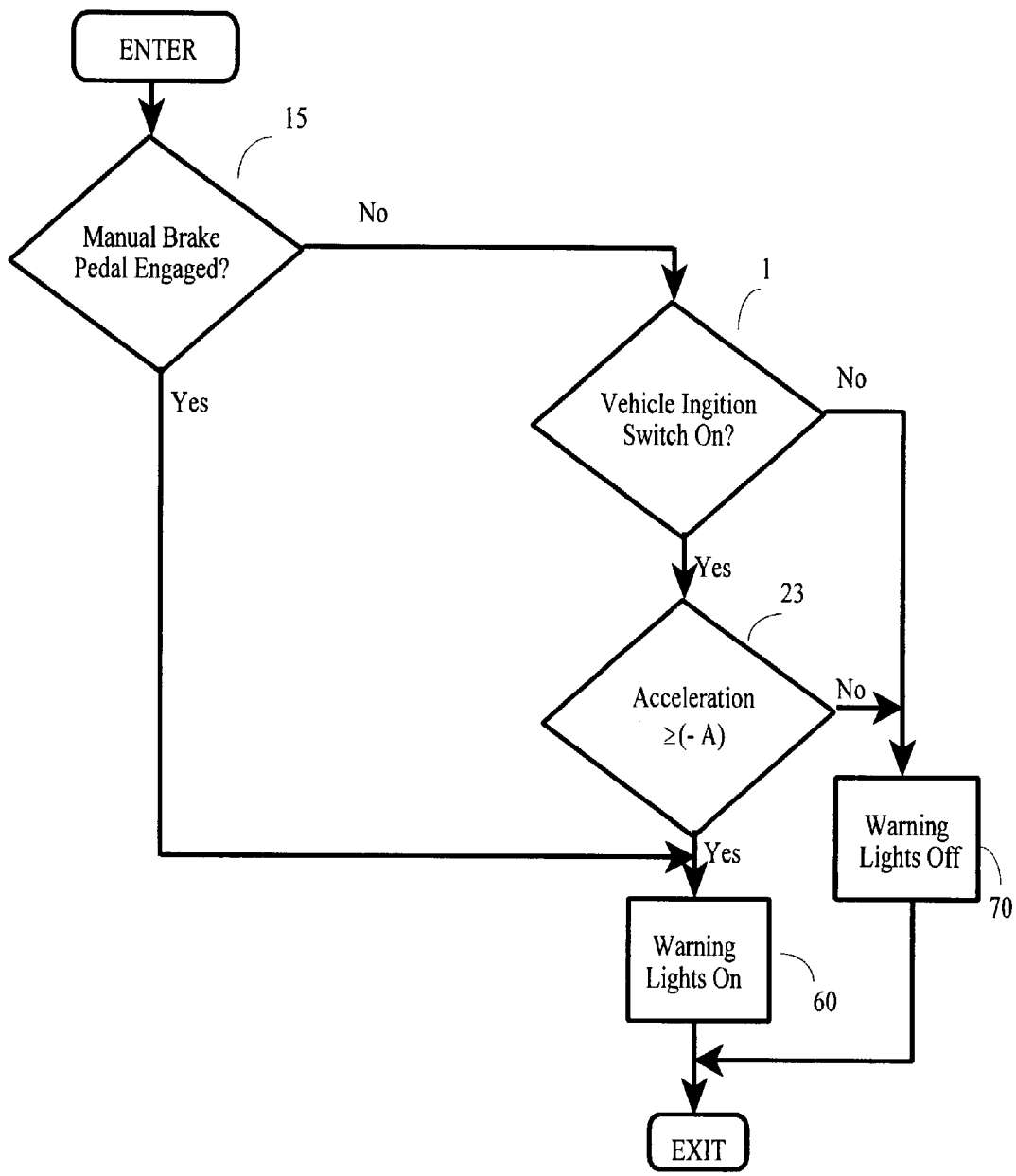
FIG. 5 is a flow diagram illustrating the operation of the electronic unit in accordance with the principles of an alternative embodiment of this invention.

FIG. 5 depicts a flow diagram illustrating the operation of an alternate embodiment of the present invention in accordance with the principles of this invention. As seen in this diagram, the manual brake pedal switch 15 acts independent of the present invention, thus preventing the downshifting warning system from interfering with the driver's manual activation of the brake lights. In this embodiment, the vehicle's acceleration is compared to a predetermined threshold rate of acceleration "A." If the vehicle's acceleration equals or exceeds this predetermined rate of acceleration then a signal will be transmitted to activate the vehicle's warning lights.

Specific thresholds of vehicle deceleration and rate of rotation of the vehicle engine crankshaft and activation are predetermined. An automatic cancellation feature may also be programmed into the microcontroller. It is understood that the microcontroller can be manually adjusted according to the particular vehicle and/or driver.

The manual brake pedal switch allows vehicle electrical system voltage to be connected directly to the brake lights. This arrangement allows the vehicle operator to activated the brake lights manually via the brake pedal regardless of the present invention.

Although the invention has been described with respect to controlling the standard brake lights on an automobile having a manual transmission, it is understood that it may control any vehicle light system for warning following vehicles. Thus the term brake lights as used herein includes any vehicle mounted lights for alerting or warning other vehicles of deceleration solely from downshifting of a manual transmission.

The term acceleration as used herein includes negative acceleration or deceleration. The term frequency as used herein pertains to pulses per interval of time.

Additionally, diodes, resistors and/or other electrical components may be utilized in conjunction with the present invention for improving the routing and/or efficiency of the electrical circuit and regulating electrical system voltage.

Having thus described the invention with particular reference to the preferred forms thereof it will be obvious that various changes and modifications may be made therein without departing from the spirit and scope of the invention as defined in the appended claims. It should also be noted that while the foregoing description pertains to a digital system, the invention can be constructed on either a digital or analog circuit basis.

What is claimed is:

1. A vehicle downshift warning system comprising:
   a) an indicator on the vehicle and energizable to yield a warning signal;
   b) a first means for detecting the vehicle's acceleration and deceleration and developing a first control signal having a first variable parameter;
   c) a second means for detecting the vehicle engine crankshaft's increased and decreased rate of rotation and developing a second control signal having a second variable parameter; and
   d) means responsive to said first and second variable parameters for energizing said indicator.

2. The vehicular downshift warning system of claim 1 in which the first detecting means includes an accelerometer that develops said first control signal.

3. The vehicular downshift warning system of claim 1 in which the second detecting means includes a tachometer that develops said second control signal.

4. The vehicular downshift warning system of claim 1 in which the responsive means includes a microcontroller to activate the brake lights.

5. A vehicular downshift warning system comprising electronic circuitry which causes the brake lights to automatically activate under deceleration and remain activated until automatically reset by electronic recognition of the absence of deceleration, said electronic circuitry comprising:

a) sensing means for detecting the vehicle's deceleration;
   b) said sensing means including means to produce a signal indicating the rate of deceleration of the vehicle;
   c) means to determine when the rate of deceleration exceeds a predetermined threshold level for a first predetermined time interval;
   d) means to automatically deactivate the brake lights when the rate of deceleration drops below the predetermined threshold level for a second predetermined length of time; and
   e) whereby the brake lights are automatically activated to provide a warning that a deceleration of the vehicle is occurring or has taken place and automatically deactivate when the vehicle's rate of deceleration drops below the predetermined threshold level for the second predetermined length of time.

6. The vehicular warning system of claim 5 in which said sensing means includes a digital accelerometer.

7. The vehicular downshifting warning system of claim 5 wherein the means to activate the brake lights further comprises a microcontroller.

8. A vehicular downshifting warning system for use with a conventional brake lighting system on a vehicle equipped with a power source and a brake pedal, comprising:

(a) warning lights mounted on a vehicle;
   (b) brake switch means closed when a brake pedal is engaged; and opened when the brake pedal is disengaged;
   (c) a microcontroller including a clock generator which is activated upon closure of the ignition key switch, said clock generator produces a clock signal which is transmitted to a digital accelerometer and a digital tachometer, said accelerometer generates a number of pulses per clock cycle which represents both the amount and direction of acceleration of the vehicle, said tachometer generates a number of pulses per clock cycle which represents both the amount or rate of change in the vehicle engine crankshaft's rotation, said microcontroller is programmed to transmit an "on" signal when both an accumulated pulse count indicative of deceleration and an accumulated pulse count indicative of an increase rate of the vehicle crankshaft rotation is recognized.

9. A vehicular downshifting warning method for use with a conventional brake lighting system on a vehicle comprising: the method of automatically activating the vehicle's brake lights when the vehicle exceeds a predetermined rate of deceleration while the vehicle engine's crankshaft exceeds a predetermined rate of rotation, indicating deceleration by downshifting.

10. A method of activating a vehicle's warning lights while decelerating solely by downshifting, comprising:

a) determining the vehicle's rate of acceleration;
    b) determining the vehicle engine crankshaft's rate of rotation;
    c) generating an activation signal when both the vehicle's deceleration exceeds a predetermined threshold and the vehicle crankshaft's rate of rotation exceeds a predetermined threshold.

11. A vehicle downshift warning system comprising:

a) an accelerometer for measuring the change in speed of the vehicle for generating a first output signal;
    b) a tachometer for measuring the vehicle engine crankshaft's rate of rotation for generating a second output signal; and
    c) a microcontroller that combines the first and second output signals to activate the vehicle's brake lights.

* * * * *